358-84. OR 3,514,530 SR

May 26, 1970 K. A. SIMONS 3,514,530

METHOD OF METERING RECEIVERS IN A WIRED TV DISTRIBUTION SYSTEM

Filed Sept. 28, 1967 4 Sheets-Sheet 1

INVENTOR.
KENETH A. SIMONS

BY
Hopgood & Calimafde
ATTORNEYS

INVENTOR.
KENETH A. SIMONS
BY
Hopgood & Calimafde
ATTORNEYS

METHOD OF METERING RECEIVERS IN A WIRED TV DISTRIBUTION SYSTEM

Filed Sept. 28, 1967

INVENTOR.
KENETH A. SIMONS
BY
Hopgood & Calimafde
ATTORNEYS

INVENTOR.
KENETH A. SIMONS

BY

Hopgood & Calimafde
ATTORNEYS

United States Patent Office 3,514,530

Patented May 26, 1970

3,514,530

METHOD OF METERING RECEIVERS IN A WIRED TV DISTRIBUTION SYSTEM

Keneth A. Simons, Bryn Athyn, Pa., assignor to Jerrold Electronics Corporation, Philadelphia, Pa., a corporation of Delaware Filed Sept. 28, 1967, Ser. No. 671,408

Int. Cl. H04n *7/16, 7/10*

U.S. Cl. 178—5.1 16 Claims

ABSTRACT OF THE DISCLOSURE

This invention relates to metering receivers in a wired TV distribution system by interrogating each receiver on the video lines and receiving each receiver reply. The interrogation is accomplished by variably modulating each channel frequency at the station on the unused top video lines of a conventional TV receiver. Each TV receiver responds to the modulated channel frequency by transmitting a specific frequency signal which is representative of that particular receiver.

This invention relates to a method and means for metering receivers in a wired television distribution system. More particularly, it relates to a system for providing at a central location, continuous information as to whether a given receiver on the system is in use, and to what channel it is tuned. The system further provides information as to how many receivers are tuned to each channel.

Prior systems for providing information as to the identification of the program to which a TV receiver is tuned and returning this information to a central point, can be divided into two types:

(1) Information systems, which are intended to provide statistical information as to how many of the potential audience are tuned to a given channel at a given time; and (2) Billing systems, which are intended to identify the channel each specific set is tuned to at all times.

One of the objects of this invention is to provide a system which can be used for either purpose.

Another object of this invention is to provide precise information to identify the channels to which an individual receiver is tuned on a continuous basis to provide billing data, and popularity information.

A further object of this invention is to provide simple receiver identification circuits which are coupled to the receiver but do not interfere with reception in a cable TV system.

Another object of this invention is to provide a secure, tamper-proof identification circuit installation on a customer's receiver.

The above mentioned and other features and objects of this invention and the manner of attaining them will become more apparent and the invention itself will be best understood by reference to the following description of embodiments of the invention taken in conjunction with the accompanying drawings, wherein.

Figure 1:
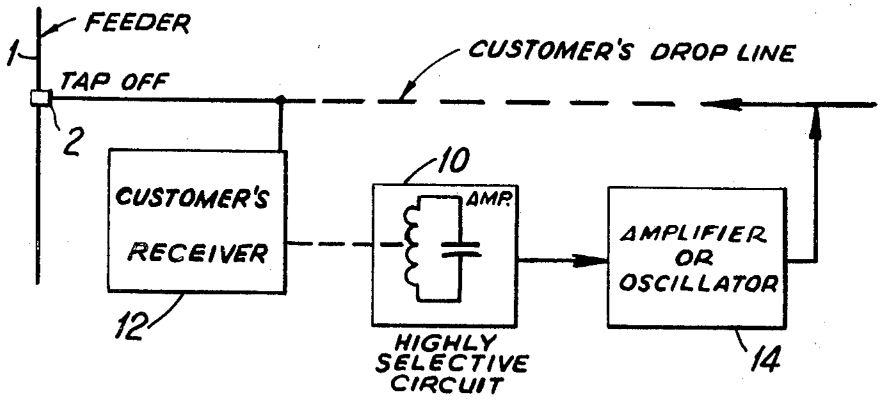
FIG. 1 is a diagram of the receiver circuit showing an identification unit.

Referring now to FIG. 1, there is shown the feeder cable 1 and a conventional tap off 2 connecting to the customer's drop line and to the customer's television receiver 12. I provide a highly selective circuit 10 coupled to the video output of the customer's receiver 12. When a signal is received at the frequency of this circuit, this signal is amplified and returned along the line at this frequency, or alternatively keys an oscillator to return a signal at some other frequency.

Figure 2:
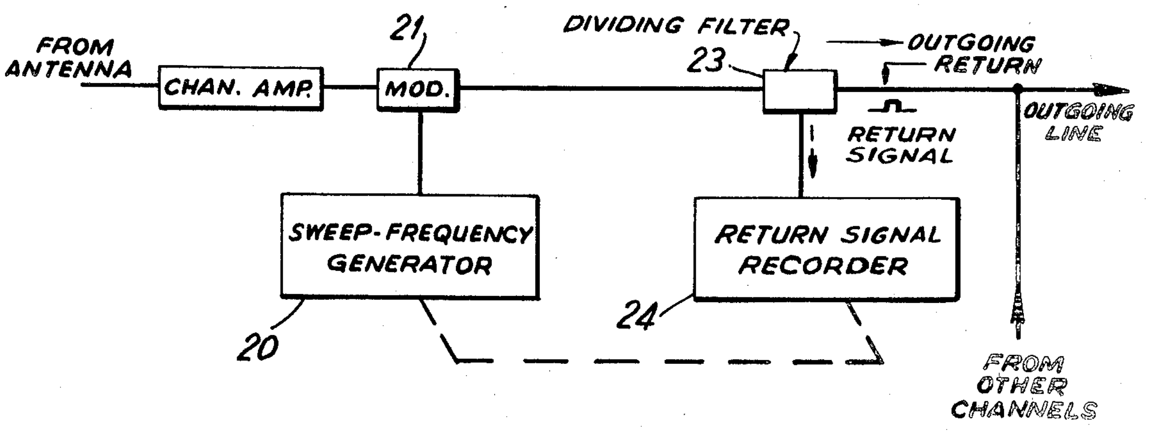
FIG. 2 is a diagram of the transmitting means illustrating the means for questioning the receivers.

At the central distribution point illustrated in FIG. 2, there are provided sweep-frequency generators 20 (one for each channel) which sweep through a selected band of video frequencies covering all the frequencies to which the selective circuits at all the receivers are tuned. The output of each generator 20 is appied to modulator 21 to modulate the radio frequency carrier in the associated channel in a way that does not affect the customer's reception. The modulated carrier passes through dividing filter 23 into the outgoing line.

The answer to the questioning signal is sent back as a signal at the same frequency to which the selective circuit responds. The dividing filter 23 diverts returning video frequency signals to the recording receiver 24. The recording receiver 24 detects the returned signals, and by noting the frequency of the sweep generator at the time a given signal arrives, identifies the receiver from which it originates. A sweep generator and pulse receiver are thereby associated with each channel and a system of time-sharing or frequency selection separates the operation of each channel system from the others.

The return signals may be at a video frequency other than that of the responder, and the combination of the two frequencies may be used to identify the particular customer.

This system has a basic advantage in that the customer unit receives its input from a particular channel through the customer's set. Thus it has an input timed to whatever is being sent out on that channel, and only on that channel; and it has input only when the customer's set is turned on and tuned to an active channel.

The responder includes structure to provide an identifiable code. Although responder coding could be accomplished in any one of a number of ways, including pulse height, pulse duration or various combinations of pulses, in the preferred mode each responder is assigned a characteristic frequency or combination of two frequencies, the frequency of the responding circuit and that of the return oscillator.

In an aspect of this invention a quartz crystal serves the purpose of providing a precise filter for a simple frequency code. The filter allows the responder to couple some of the selected channel at the video output (the input to the picture tube) back into the same cable that brings the TV signals into the home. When a strong component is present in the video output of the receiver at the resonant frequency of the crystal, it is transmitted back into the cable.

By using frequences between for example 1000 and 3000 kc., and spaced for example 2 kc. apart, as many as 1000 responders can be separately identified.

The use of quartz crystals to provide the "peculiarity" at each responder has several advantages. They are relatively inexpensive and relatively precise. Their use allows construction of a responder unit with no active devices and no power requirements—an appealing feature from cost standpoint.

Figure 3:
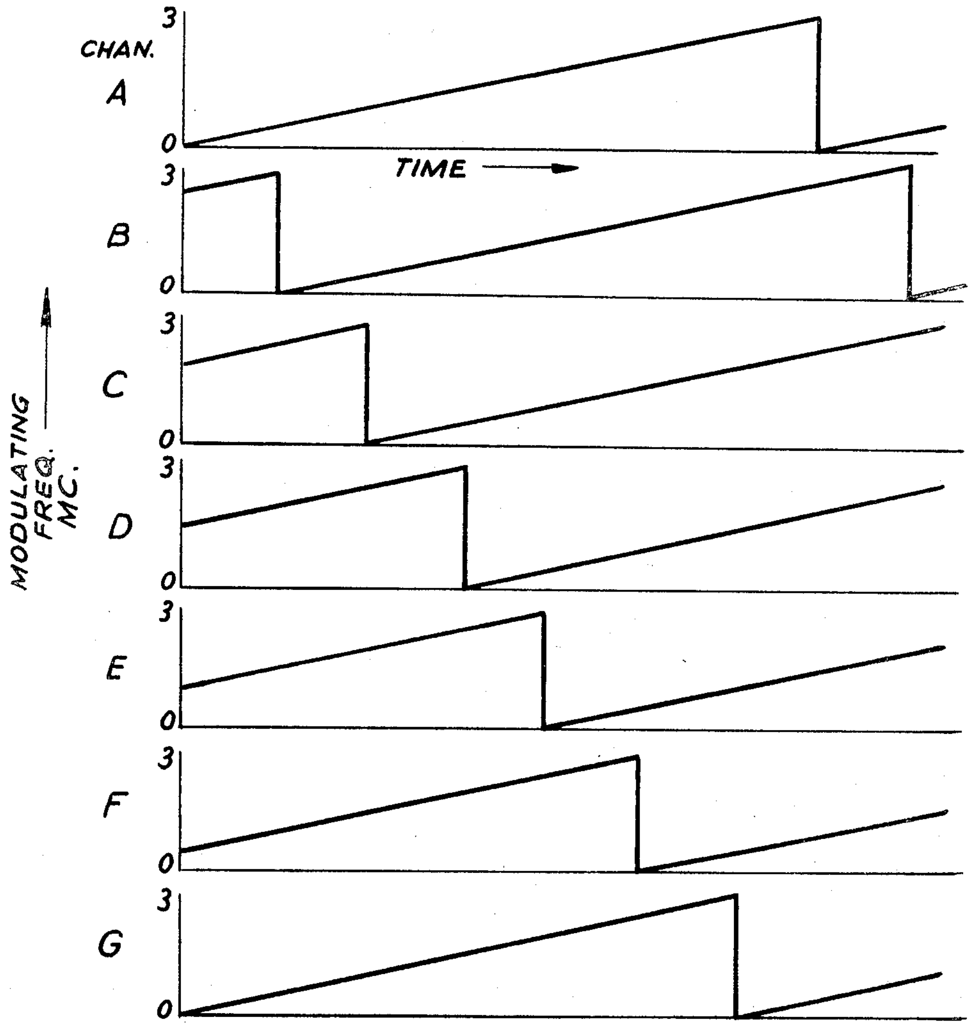
FIG. 3 is a diagram illustrating staggered interrogation times and signals.

Most present day receivers complete vertical retrace long before the vertical blanking period ends; thus there are five or ten blank and unused lines at the top of each frame (herein referred to as the top video lines) that can be used for transmitting the questioning signal without causing visible effect. The questioning signal may therefore be transmitted as additional modulation on the picture carrier being used on a given channel, without interfering in any way with the customer's reception. The questioning signal may be sent out in the form of bursts of sine-wave swept slowly over a frequency range, for example, from 1 mc. to 3 mc. as suggested in FIG. 3 for channels A–G. This questioning signal may be keyed in during the five or ten horizontal lines immediately following the vertical synch pulse. The time interval during each frame that the questioning signal is transmitted will be referred to as the interrogation period. Since the scanning spot on the receiver is above the top of the screen at this time, there would be no visible effect on the receiver. The sweeps for respective channels can begin at different times.

In operation the Return Signal Recorder (24 in FIG. 2) may be highly selective and may be coupled to the Sweep Generator 20 for the particular channel. In this way, it is sensitive only at the frequency in the returned signals corresponding to its own channel and does not respond to returned signals for the other channels.

Figure 4A:
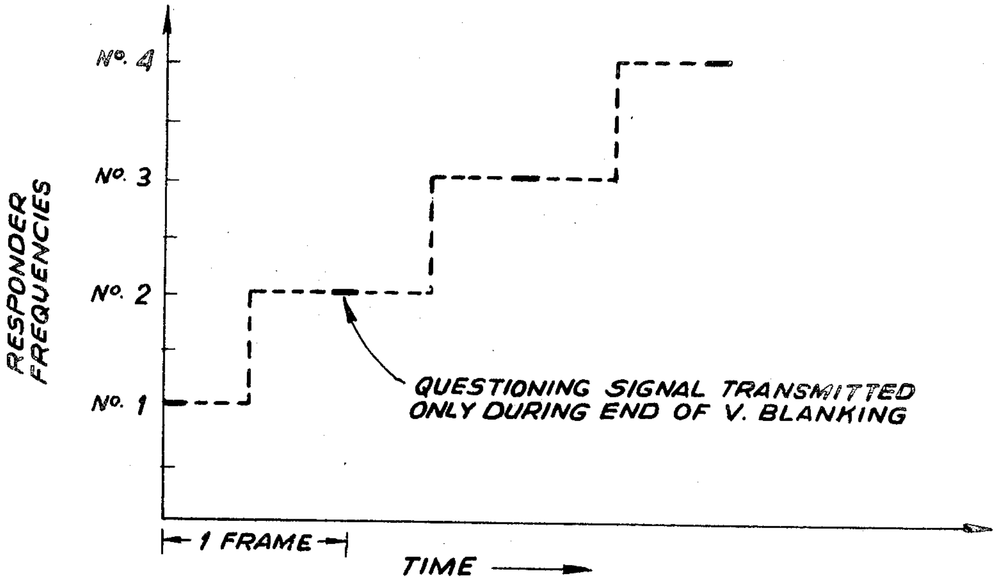
FIGS. 4A and 4B are waveform diagrams illustrating the sweep pattern used in questioning the receivers.
Figure 4B:
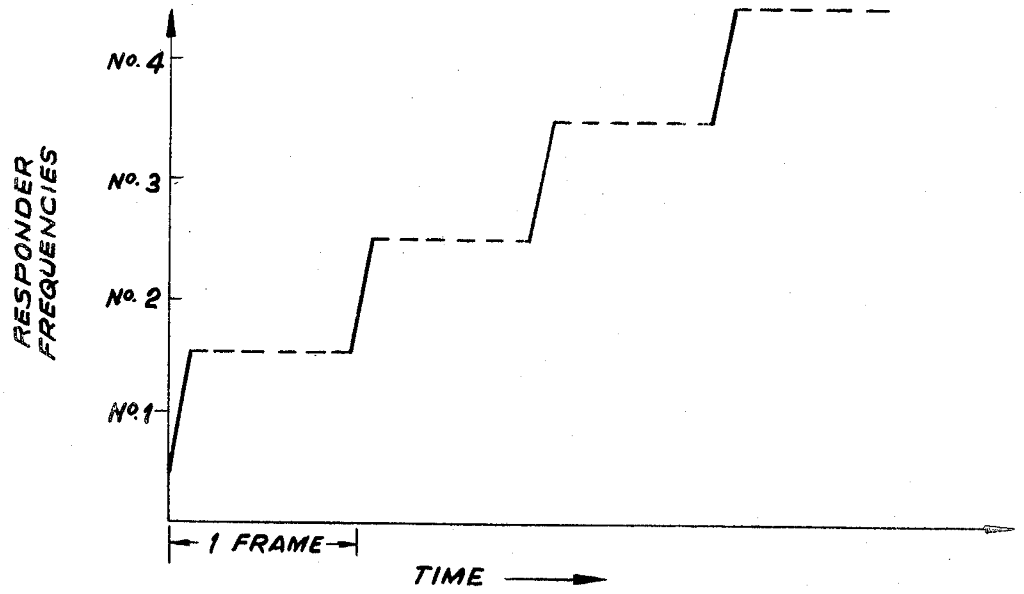

FIGS. 4A and 4B illustrate two other interrogating techniques for changing the interrogating signal frequency, the step change and the sweep change.

In the step change, the questioning signal is transmitted at a frequency which is constant during any one interrogation period, and which is switched successively to each of the responder frequencies. Here, the frequency of the questioning signal is controlled on each transmission by frequency selective means, such as separate quartz crystals each matched in frequency to the corresponding responder crystal.

High-speed mechanical switching or electronic switching may be employed to connect the various questioning signal crystals into the circuit in sequence.

In the sweep change mode, the questioning signal varies in frequency during each interrogation period, moving from a frequency on one side of the corresponding responder frequency, past it to the other side. In each successive interrogation period it sweeps past a different responder frequency in this manner.

This technique employs precise control of frequency so that the sweep can be made to start on one side of the desired responder frequency and sweep past it, but the required degree of precision is not as great as in the step-change approach. There is considerable tolerance on the start and stop frequencies within which a full-strength return signal will be obtained.

The choice between these two techniques may be determined by the use of the system. For Billing, in which very precise identification of each subscriber is required, the switch system may be preferred; for Information, where only the total number of responses is important, the sweep system may be preferred.

The responding signal receiver is a highly selective receiver having a bandwidth of the order of the spacing between adjacent responder frequencies. It may be tuned continuously so that it is only sensitive to a frequency corresponding to the questioning signal being sent out at a given time.

Block diagram of a typical system

Figure 5:
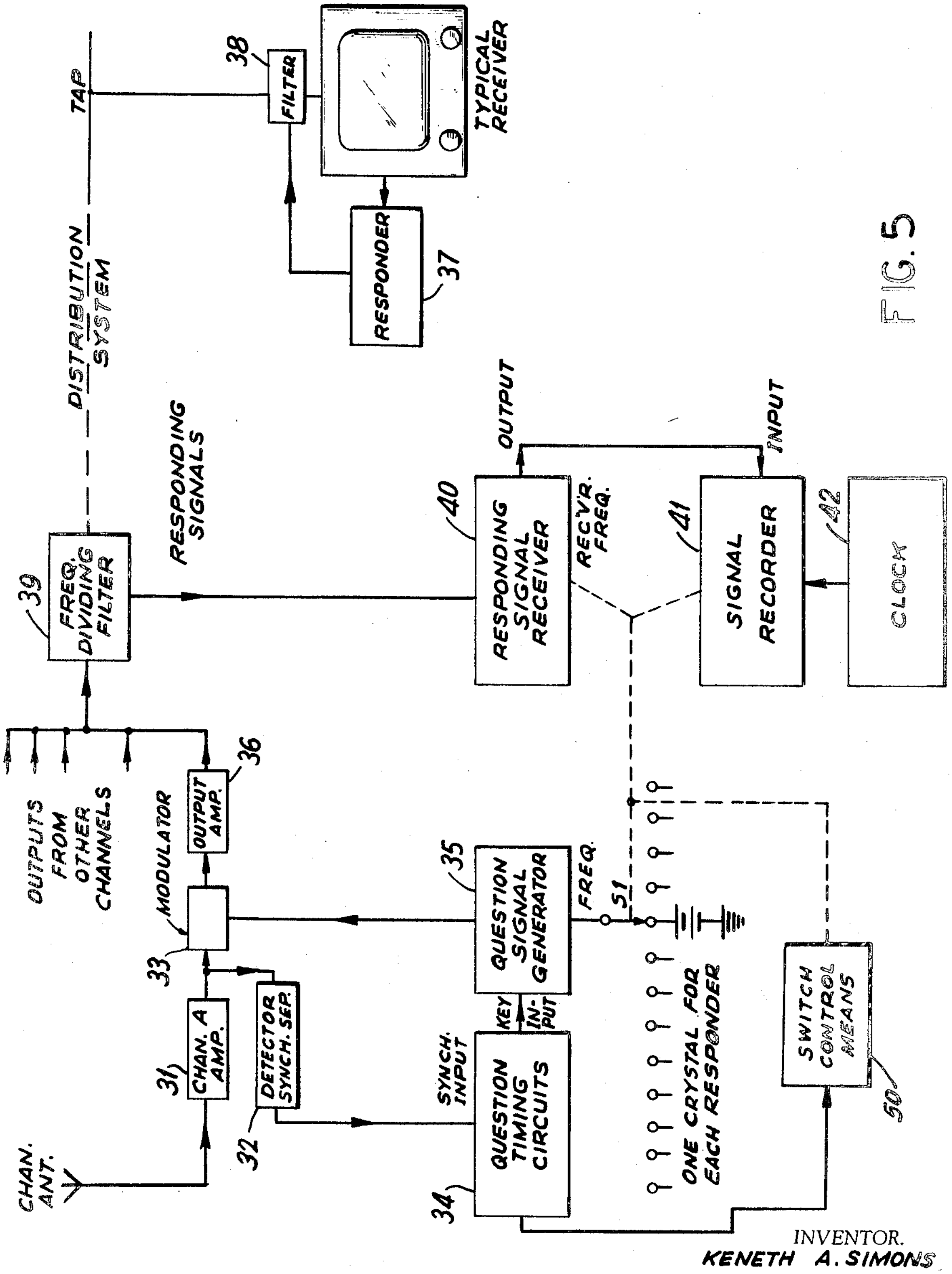
FIG. 5 is a block diagram of one embodiment of the invention.

FIG. 5 shows a block diagram of a typical system for metering TV receivers, using the principles outlined herein. A channel "A" television signal from an antenna, or from a preliminary part of the distribution system, is amplified to a suitable level by channel amplifier 31. The output of this amplifier splits two ways, one branch feeding a video detector and synchronizing signal separator 32, the other branch feeding an interrogation signal channel modulator 33.

The synchronizing signal is connected to the synchronizing input of the Question Timing Circuits 34. This unit generates a gating signal timed to occur during the interrogation period, a few lines after the end of incoming vertical synch signal. This gating signal is applied to the keying input of the Question Signal Generator and turns it on during these lines; it also controls the operation of the frequency sweeping circuit or switch S1. That is, switch control means 50 may cause switch 1 to advance and connect another crystal in accordance with the output from circuit 34. If one crystal is connected for each frame, then the timing circuit responds to the vertical synch pulse to provide a tuned actuating signal to control means 50.

The frequency of the question signal generator is determined by crystals connected through crystal selector switch $S_1$. The output of the question signal generator is connected to the modulator 33 for channel A. The output of the modulator, with the channel signal and the superimposed question signal, is coupled through an output amplifier 36 to the outgoing distribution system.

Other switch means, not shown, may be coupled to $S_1$ mechanically and controlled by switch control means 50 in such a way that $S_1$ selects one crystal during the corresponding vertical blanking interval or frame (each $1/60$ second), while the other switches stay on a given channel, A, B, C etc., position until all crystals have been connected, then switch to the next channel position. This continues until all question frequencies have been transmitted on all channels when the operation is repeated.

At a customer's receiver, the responder 37 is excited when its frequency appears in the video output and sends back a pulse which is coupled into the distribution system through filter 38.

The responding signals are split off from the channel signals at the central point by filter 39 and fed to the input of the responding signal receiver 40. The frequency of this receiver is coupled to $S_1$ so that it tracks the questioning signal frequency. Its output is recorded by signal recorder 41 on coordinates that also indicate the channel (derived from mechanical coupling to $S_1$) and the time (from clock 42).

The frequency of the questioning signal on each channel may be varied from 0 to 3 mc. at a low frequency; and the time at which each one starts is staggered so that no two are moving past the same frequency at the same time. Thus when channel D is moving from 0.8 to 1.2 mc., C will be between 1.2 and 1.6, and E will be between 0.4 and 0.8, etc. as suggested. The responding signal receiver 40 is tuned synchronously for each channel with the questioning signal (either to the same frequency at each instant, or to that frequency plus a constant ($f_c$) when a mixing scheme is used) and responds only to return pulses coming from customers tuned to that channel. Thus the output of each receiver will contain full information concerning the sets that are tuned to the corresponding channel.

Sequetial vs. simultaneous transmission on TV channels

On the basis of using the time of one vertical blanking period to question a responder and obtain a reply, information can be collected at the rate of 3600 questions per minute. If more than one responder is sampled during the vertical blanking period, this capacity will increase.

The most efficient way to use the equipment at the central point is first to question all responders on one channel; then, using the same question transmitter and receiver, question them all on another TV channel, sequentially. With this technique, the time required to check all responders on all channels, the sampling interval, will be found by dividing 3600 into the product of the number of channels and the number of responders. Thus a 5 channel system with 1000 responders could be checked in a little more than 1½ minutes. A more general expression for the sampling interval, in minutes, is:

$$\text{Sampling interval} = \frac{\text{no. of channels} \times \text{no. of responders}}{\text{no. of interrogation periods} \times 60 \text{ sec.}}$$

If there is one interrogation period per frame, then the sampling interval is simply the $$\frac{\text{no. of channels} \times \text{no. of responders}}{3600}$$

To achieve simultaneous operation, the individual question transmitter frequencies are varied so that each one scans a different band of frequencies at a given time. With such a system, the time required to check all responders in the system is the capacity per minute, divided into the number of responders to be checked; a 1000 responder system could be checked in about 20 seconds.

While the principles of the invention have been described in connection with specific apparatus, it is to be clearly understood that this description is made only by way of example and not as a limitation to the scope of the invention as set forth in the objects thereof and in the accompanying claims.

I claim:

1. A system for determining which television receiving sets in a wired television distribution system are in use and to which channel each is tuned, said channel signal constituting the input signals, the system comprising:

means including interrogation signal means for transmitting interrogation signals through the wired distribution system as modulation on each television channel signal, the interrogating signals being imposed as a modulation component on the top video lines of the respective channel signal;

a plurality of separate responding means each one at a respective receiving set and each including frequency selective means, each selective means tuned to a different modulation frequency for providing a distinct responding signal in response to the interrogation signal, said responding signal thereby identifying a particular receiving set;

said interrogating means further including means to vary the frequency of the interrogating signal over the band corresponding to the frequencies to which the frequency selective means are tuned during a predetermined scanning time period;

and receiving means including means returning the responding signal through the distribution system to a receiving station.

2. The system of claim 1 further comprising a plurality of frequency interrogation means operative during interrogation periods, one for each television channel, each frequency interrogation means sampling the entire range of frequencies of the responding means.

3. The system of claim 1 in which the interrogation means couples the interrogating signals to different channel signals successively for a predetermined interrogating time period for each channel, said frequency of the interrogating signal scanning the desired frequency band during the said time period.

4. The system of claim 3 in which each receiving set includes a quartz crystal resonant at different selective frequencies.

5. The system of claim 3 in which the responding signal is at the same frequency as the interrogating signal received at respective receivers.

6. The system of claim 3 in which the interrogation means transmits a constant frequency during respective interrogation periods, said frequency changing in steps in the interrogation period.

7. The system of claim 3 in which the transmitting means includes channel means responsive to selected channels, detection means for detecting vertical synchronization pulses, frequency modulating means applying the output from said interrogation signal means to the channel signal, said interrogating means including timing means responsive to the vertical synchronization pulses to control the timing and duration of the scanning time period.

8. The apparatus of claim 3, further including:

means recording signals identifying the time intervals during which respective channels are scanned;

means recording the received responder signals during the time the respective channels are scanned.

9. The system of claim 3, further including:

means receiving the input signal;

video input means including a video detector and vertical synchronizing signal separating means, said synchronizing signal separating means providing at its output the vertical synchronizing signal;

channel modulating means;

said receiving means applying the input signal to said video input means and said modulating means;

interrogating signal means including means to provide a frequency scan signal over a band containing a plurality of different frequencies;

timing means coupled to said synchronizing means and responsive to said synchronizing signal to initiate said interrogating means;

means applying the frequency scan signal from said interrogating means to said channel modulating means as frequency modulation and in timed relationship to apply said frequency modulation to the top lines of the video signal;

recorder means including means to record in timed relationship signals representing the frequency scan signals transmitted, whereby the time relationship of these frequency scan signals represents particular channels scanned during the scan time period;

responder signal means;

frequency selective means coupling the returning responder signals, each being frequency distinctive, coupling said signals to said recorder means;

whereby for each scan time period representing a particular channel interrogated, the recorder will record signals identifying each receiver tuned to the particular channel.

10. The system of claim 9 in which the responding signal is at the same frequency as the interrorgating signal received at respective receivers.

11. The system of claim 9 in which the interrogation means transmits a constant frequency during respective interrogation periods, said frequency changing in steps in the interrogation period.

12. The system of claim 9 in which the frequency scan signal varies substantially linearly in frequency.

13. A method for determining the channels to which at least one television receiving set is tuned in a wired television distribution system and in which the television signal includes vertical synch pulses between frames and further including a plurality of top video lines, said method comprising the steps of:

applying a plurality of interrogation signals to the channel signals in a predetermined time relationship, each interrogation signal being a modulation component to the top video line signals of a single respective channel;

transmitting said channel video signals including interrogation signals through the wired distribution system at different timed intervals for each channel;

providing in response to each respective interrogation signal a responding signal at the receiving set containing information identifying the receiving set providing the responding signal and thereby identifying the respectve receiving set as being tuned to the respective channel;

and returning the responding signal through the distribution system to a receiving station to provide information as to the channel to which a responding receiver is tuned at time intervals correlated with the time of transmission of respective interrogating signals.

14. The method of claim 13 including the steps of recording the received signals in time correlated with the time that the interrogating signal is transmitted for respective channels.

15. A method for determining the channels to which at least one television receiving set is tuned in a wired television distribution system and in which the television signal includes vertical synch pulses between frames and further including a plurality of top video lines, said method comprising the steps of:

applying a plurality of interrogation signals to the channel signals, varying in frequency over a predetermined range, each interrogation signal being a frequency modulation component to the top video line signals of a single respective channel;

transmitting said channel video signals including said interrogation signals through the wired distribution system;

providing in response to each respective interrogation signal selective frequency responsive means providing a responding signal at the receiving set containing information identifying the channel to which said receiving set providing the responding signal and thereby identifying the respective receiving set as being tuned to the respective channels;

and returning the responding signal through the distribution system to a receiving station to provide information as to the channel to which a responding receiver is tuned at time intervals correlated with the time of transmission of respective interrogating signals.

16. The method of claim 15 including the steps of recording the received signals in time correlated with the time that the interrogating signal is transmitted for respective channels.

References Cited

UNITED STATES PATENTS

| | | | |
|---|---|---|---|
| 3,058,065 | 10/1962 | Freeman et al. | |
| 3,078,337 | 2/1963 | Shanahan et al. | 178—5.1 |
| 3,255,306 | 6/1966 | Campbell et al. | 178—5.1 X |
| 3,281,695 | 10/1966 | Bass | 178—5.1 X |

RODNEY D. BENNETT, Jr., Primary Examiner

M. F. HUBLER, Assistant Examiner